United States Patent [19]

Zichy

[11] Patent Number: 4,549,389

[45] Date of Patent: Oct. 29, 1985

[54] PRECHARGED CONTAINERS

[76] Inventor: Theodore B. R. Zichy, 8 Sandwich St., London WC1H 9PL, England

[21] Appl. No.: 491,989

[22] Filed: May 5, 1983

[51] Int. Cl.[4] .................. B65B 29/06; B65B 7/28; B65B 51/10; A47G 19/22
[52] U.S. Cl. ............................. 53/471; 53/478
[58] Field of Search ........... 53/478, 488, 489, 412, 53/471, 474

[56] References Cited

U.S. PATENT DOCUMENTS

| | | | |
|---|---|---|---|
| 1,846,670 | 2/1932 | Barbieri | 53/486 |
| 2,252,779 | 8/1941 | Moore | 53/478 X |
| 2,588,604 | 3/1952 | Archer | 53/478 X |
| 2,875,563 | 3/1959 | Moore | 53/478 |
| 3,060,652 | 10/1962 | Eckman | 53/478 |
| 3,471,992 | 10/1969 | Amberg et al. | 53/478 |
| 3,720,038 | 3/1973 | Bryan, Jr. et al. | 53/478 X |
| 3,962,844 | 6/1976 | Gordon | 53/478 |
| 4,207,725 | 6/1980 | Smith | 53/471 |
| 4,338,765 | 7/1982 | Ohmori et al. | 53/478 X |
| 4,348,421 | 9/1982 | Sakakibara et al. | 53/474 X |

FOREIGN PATENT DOCUMENTS 1603421 11/1981 United Kingdom .

Primary Examiner—Horace M. Culver
Attorney, Agent, or Firm—Scrivener Clarke Scrivener & Johnson

[57] ABSTRACT

A method of hermetically sealing a predetermined quantity of alcohol into a chamber provided at the bottom of a stackable disposable container of plastics material by securing a lid or cover having the thickness of foil to a ledge defined at the transition of the chamber with the remainder of the container. The method involves filling the container in such manner that the ledge is not wetted by the alcohol and than securing, by a combination of the effect of heat and pressure acting on the material of the cover and that of the ledge, the lid or cover to the ledge. Conveniently, a peripheral skirt is provided around the periphery of the lid or cover which is not adhered to the container.

5 Claims, 5 Drawing Figures

PRECHARGED CONTAINERS

BACKGROUND OF THE INVENTION

This invention relates to disposable containers having a charge or pre-filling of a predetermined quantity of a liquid material to which a second liquid may, if desired, be added in order to produce a required solution of the liquid material.

There are available today various types of dispensing containers which are adapted to house a predetermined quantity of a material or product to be dispensed.

It is in particular known to provide a container with a lid formation which effectively divides the container into two compartments, of which one is used to house the predetermined quantity of the liquid material.

With the known systems difficulties have been found in providing a satisfactory mode of sealing in liquids which are able to vapourise readily and which are prone to contamination by the sealing-in process and/or by the materials used for the lid formation and the container.

SUMMARIES OF THE INVENTION

It is an object of the present invention to provide a precharged container which is able to house for lengthy periods a predetermined quantity of a liquid material without the material becoming contaminated.

It is a further object of the invention to provide a precharged container having two compartments one of which contains the predetermined quantity of the liquid material and which is sealed from the other compartment by a readily removable lid formation, which allows the precharged containers to be stacked.

A further object of the invention is to provide a precharged container which is able to house in the sealed compartment an alcoholic liquid without the latter loosing, as a consequence of being stored in the container, those characteristics which are considered to be important in relation to an alcoholic liquid used as a beverage.

According to a first aspect of the invention there is provided a method of hermetically sealing a predetermined quantity of alcohol or like liquid into a container of plastics material by means of a lid or cover applied to a predetermined zone of the wall of the container, the method comprising the steps of; forming a blank which is to provide the lid or cover from plastics or metallic material having the thickness of foil, the blank being of such size and shape as to be able to bridge the container, provide a marginal region that is securable to the zone, and also to provide after the securing a peripheral skirt region extending outwardly of said marginal region; supporting the blank in such manner that the marginal region can be caused to contact with the wall zone, bringing the marginal region into contact with the zone; simultaneously producing a temperature differential between said marginal region and said zone and predetermined pressure between the marginal region and the zone the temperature and pressure combination being such that following the removal of the temperature differential and the pressure the marginal region of the lid or cover is so secured to the container wall zone as to produce the hermetic seal whilst permitting removal of the lid or cover by a peeling action when it is required to break the hermetic seal.

A second aspect of the invention provides a method of hermetically sealing a liquid receiving chamber located at the lower section from a liquid receiving chamber located at the upper section of a stackable disposable container of plastics material, in which the two chambers connect with each other by way of a peripheral step or ledge between said chambers, the method including the steps of; forming a lid or cover producing blank from a plastics or metallic material having the thickness of foil, the blank being of such dimensions that it may be secured to the step or ledge and also to provide a peripheral skirt region; supporting the blank such that the blank may be brought into contact with the step or ledge; bringing the blank into co-operation with the ledge in such manner that the blank covers in the chamber; exerting pressure upon that part of the blank that is in co-operation with the step or ledge whilst simultaneously heating the said part to a temperature that following removal of the pressure and heating the part has been so adhered to the step or ledge as to produce a hermetic seal between the said part and the step or ledge whilst said peripheral skirt region is adhered to said container, said hermetic seal permitting subsequent removal of said lid or cover by a peeling operation.

Conveniently, a predetermined quantity of alcohol is introduced into the lower chamber prior to the securing of the lid or cover by guiding the alcohol to a location adjacent to the bottom of the container prior to the release of the alcohol into the chamber.

Preferably, the means for guiding the alcohol into the chamber includes a pouring spout having at its lowermost end outlet openings for the release of the alcohol, and having at its upper end inlet openings which are utilised as part of a control valve arrangement controlling flow of the alcohol through the pouring spout.

Preferably, the arrangements for supporting the blank include vacuum orifices whereby the blank is supported by suction effects, and in which the arrangements also serve to mount the means for heating the marginal regions of the blank and the associated part of the container and the means for producing the pressure.

BRIEF DESCRIPTION OF THE DRAWINGS

For a better understanding of the invention and to show how the same may be carried into effect reference will now be made to the accompanying drawings in which.

DESCRIPTION OF THE PREFERRED EMBODIMENT

Figure 1:
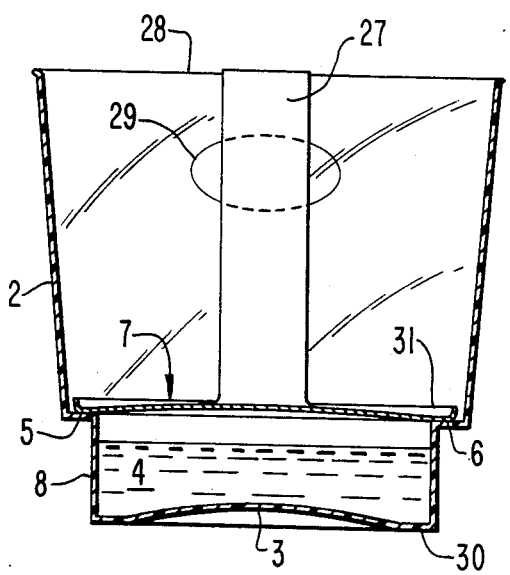
FIG. 1 is a cross-sectional view of a disposable container precharged with a quantity of a liquid material; the Figure illustrating a container as provided to a user.

Referring now to the drawings and more particularly to FIG. 1 this Figure shows a container or beaker 1 having a generally tapered wall 2 defining an upper chamber 2a and which is stepped to provide a lower chamber 4 closed by a base 3 and having a smaller external diameter than the lowermost portion of the wall 2. The stepping defines a circumferential or peripheral ledge 5. This ledge defines a transition zone between the lower chamber 4 and the upper chamber 2a of the container 1 as represented by the wall 2.

The ledge provides a seating for the marginal regions 6 of a lid formation 7 which serves to seal-off the chamber 4 from the chamber 2a.

It will be noted that the side wall 8 of the chamber 4 is cylindrical and that the base 3 is slightly upwardly dished.

The chamber 4 is intended to be charged with a measured quantity of the liquid to be provided in the container. In particular the desired filling is constituted by an alcoholic beverage such as whisky, gin, vodka, brandy etc.,. It will be clearly understood that such materials have highly individual characteristics relating to frequently highly subjective factors so that it is extremely important that the liquid such as mentioned should not undergo any change or variation of the desirable characteristics during the charging of the chamber 4. Furthermore, it is also important that the filling process should not in any way wet the surface of the ledge 5.

Figure 2:
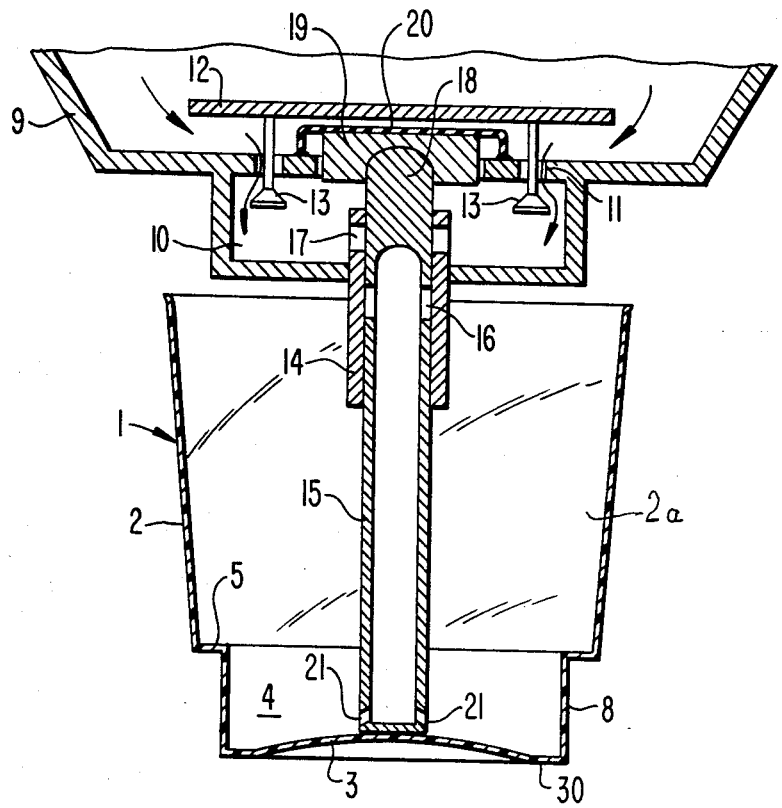
FIG. 2 is a cross-sectional view of a container during an operation in which the predetermined quantity of liquid is introduced into the container; this figure schematically illustrating an apparatus for effecting the charging of the predetermined quantity of liquid.

Referring now to FIG. 2 this shows in essentially schematic form apparatus for introducing measured quantity of a liquid such as alcohol into a container chamber 4.

The apparatus includes a main container 9 of which only a fragmentary part is shown connecting at the lower part thereof with a secondary chamber 10, the latter having a volume which is equal to that of the chamber 4. The interior of the main container 9 connects with the chamber 10 by way of valve controlled outlet orifices 11. A valve plate 12 is provided with valves 13, one for each orifice 11. The arrangement of the valve plate 12 and associated valves 13 is that the latter are normally open.

A combined vertical guide tube 14 and second valve arrangement connects with the secondary chamber 10.

A vertically arranged pouring spout 15 is vertically slidably displaceable with respect to the guide tube 14. The spout is provided adjacent its upper end with orifices 16 which are co-operable with further orifices 17 in the guide tube. These orifices 16,17 operationally combine to provide a slide valve which latter forms the above mentioned second valve arrangement. The relative arrangement of the orifices 16 and 17 and the normal or rest position of the pouring spout 15 are such that the second valve arrangement is normally closed. The upper end of the pouring spout forms a valve operating head 18 which is adapted to co-operate with a valve operating element 19, which is positioned as to be able selectively to displace the valve plate 12 between its open and closed positions. A diaphragm 20 ensures fluid tightness between the head 18 and the plate 12.

The lower end of the pouring spout 15 is provided with liquid outlet openings 21. In addition, the lower end is shaped for contact with the base 3 of the chamber 4 of a container 1.

The relative arrangement and positioning of the components of the two valve arrangements discussed above is such that when the valves 13 are open the second valve arrangement is closed and such that on lifting the pouring spout vertically upwards relative to the guide tube to bring the orifices 16 and 17 into alignment the second valve arrangement is moved to its open position whilst the head 18 displaces the element 19 upwards thereby to lift the plate 12 and thus close the valves 13.

In order to fill the containers 1 with a measured amount of alcohol, the main container is filled with alcohol. Since the valves 13 are normally open the alcohol is able to pass from the container 9 into the chamber 10 by way of the orifices 11 since the valves 13 are open. The quantity of liquid entering into the chamber 10 is equal to the amount of alcohol it is required to introduce into the chamber 4 of a container 1.

The chamber 4 is filled by presenting the container to the apparatus in such manner that the inside of the base 3 is able to press against the lower end of the pouring spout 15 and lift the latter upwardly for a distance sufficient for the orifices 16 and 17 to align with each other. When this setting is obtained it will be found that the the valves 13 are moved to their closed positions thereby preventing further flow of alcohol from the container 9 into the chamber 10. In addition, as the second valve arrangement is now open the alcohol is able to flow down the spout 15 and pass out through the outlet openings.

Since the openings are very close to the base 3 of the chamber 4 the alcohol is able gently to flow into the chamber 4 without creating turbulance or splash likely to cause wetting of the ledge 5 and the lower regions of the container wall 2 in the near vicinity of the ledge.

It will be understood that, in practice, arrangements would be made to prevent leakages, and that the relative volumes of the chambers 10 and the interior of the spout would be such as to ensure that once the chamber 10 has emptied the correct quantity of alcohol has been introduced into the container chamber 4.

On the completion of the filling of the chamber 4 relative vertical displacement is effected between the apparatus for filling and the container. This movement allows the pouring spout 15 to return towards its rest or initial position. In so doing the second valve arrangement defined by the orifices 16 and 17 is reclosed and the valves 13 are enabled to re-open to allow the chamber 10 to become recharged with alcohol from the main container 9.

The above considered apparatus can form part of a more complex system in which a plurality of the containers may be charged simultaneously. It will also be understood that other forms of charging apparatus can be used provided that the apparatus used ensures that the introduction of the alcohol does not wet the ledge 5 or the container walls 2. Thus splash guard system could be used.

Following the charging of the chamber 4 it is necessary hermetically to seal the content of the chamber 4 so that the alcohol content can neither become contaminated nor evaporate or otherwise disappear.

Thus the chamber 4 is sealed by a lid formation 7. A possible mode of introducing the lid formation into the correct position within the containers 1 will now be considered in relation to FIG. 3.

Figure 3:
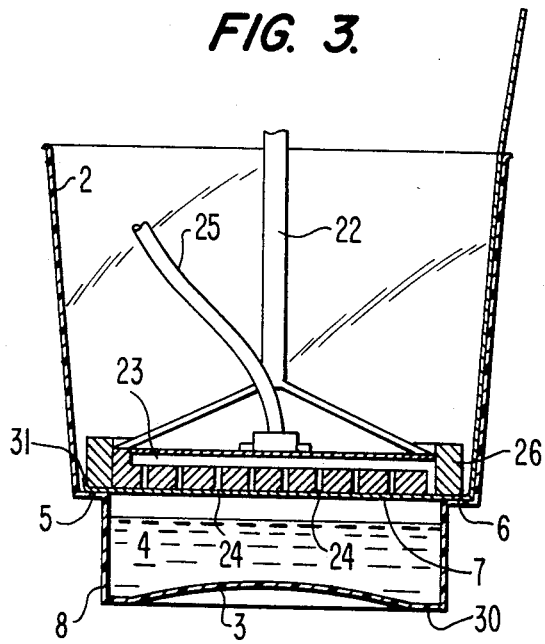
FIG. 3 is a cross sectional-view of a container schematically illustrating an arrangement for securing a lid formation for sealing-in the liquid into the lower part of the container.

In the FIG. 3 the container 1 is shown with the chamber 4 containing a charge or filling of a liquid such as alcohol in the form of a beverage such as whisky, gin, vodka, brandy or the like.

A support assembly 22 for carrying the blank which is to form the cover or lid 7 includes a plenum chamber 23 connecting with a number of suction orifices 24. The chamber 23 connects with a source of vacuum (not shown) by way of a vacuum line 25. The assembly itself is supported by a support system which enables the assembly to be lowered into a container so that the lid or cover forming blank may be brought into contact with the step or ledge 5 as is shown in the Figure.

The assembly is surrounded by a ring heater unit 26 which in the Figure comprises an annular member of the same dimensions in respect of its heating working face as that of the ledge 5. In other words the heating unit is able to heat the full surface area of the step or ledge 5 and that part of the blank for the lid or cover 7. The assembly is loaded in terms of weight so that when the heater rests upon the blank the required pressure for example, 2.5 to 3 pounds weight is produced. Alternatively the container and assembly 2 may be pressed towards each other to attain the desired contact pressure what ever the required magnitude thereof whether it is within or outside the particular range above mentioned.

In a particular example of securing the lid or cover 7 to the step or ledge 5 the ring heater unit 26 was heated to a temperature of approximately 150° Centigrade for a time period of approximately 0.5 seconds at a pressure of 2.5 to 3 pounds weight.

A pull tab 27 is secured to or is integral with the lid or cover 7. The tab is long enough to extend the full length of the wall 2 of the container 1 so as to be able to overhang the rim 28 of the container and to provide a short tab 29 which rests against the outside of the container. As can be seen from the Figures, and particularly FIGS. 4 and 5 the tab 29 is flush against the container wall.

It will be noted from the drawings that the lower chamber is of an essentially cylindrical form and that the upper chamber is shaped so as to provide a tapering. The resultant overall shaping of the container allows the containers 1 to be nested one within the other with the bottom of the lower chamber 4 resting upon the peripheral regions of the lid or cover 7 of the outer one of two successive nested containers. To facilitate the nesting the bottom 3 of the container is such as to provide an annular portion 30 which actually bears upon the lid or cover in the region of the ledge 5.

When it is desired to remove the lid or cover it is merely necessary to exert 'pull' upon the pull tab 27 with a combined upwards and sideways movement.

Figure 4:
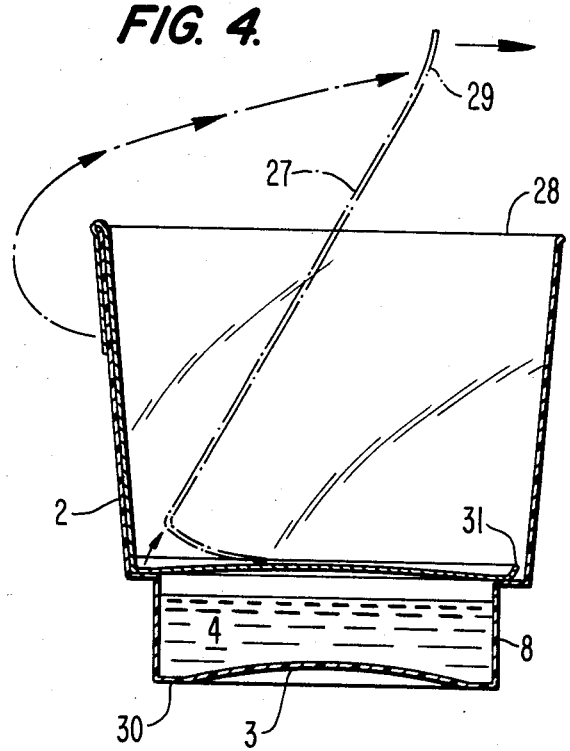
FIG. 4 is a cross-sectional view of a pre-charged container during an early stage in the preparation of the container so that the content may be imbibed.
Figure 5:
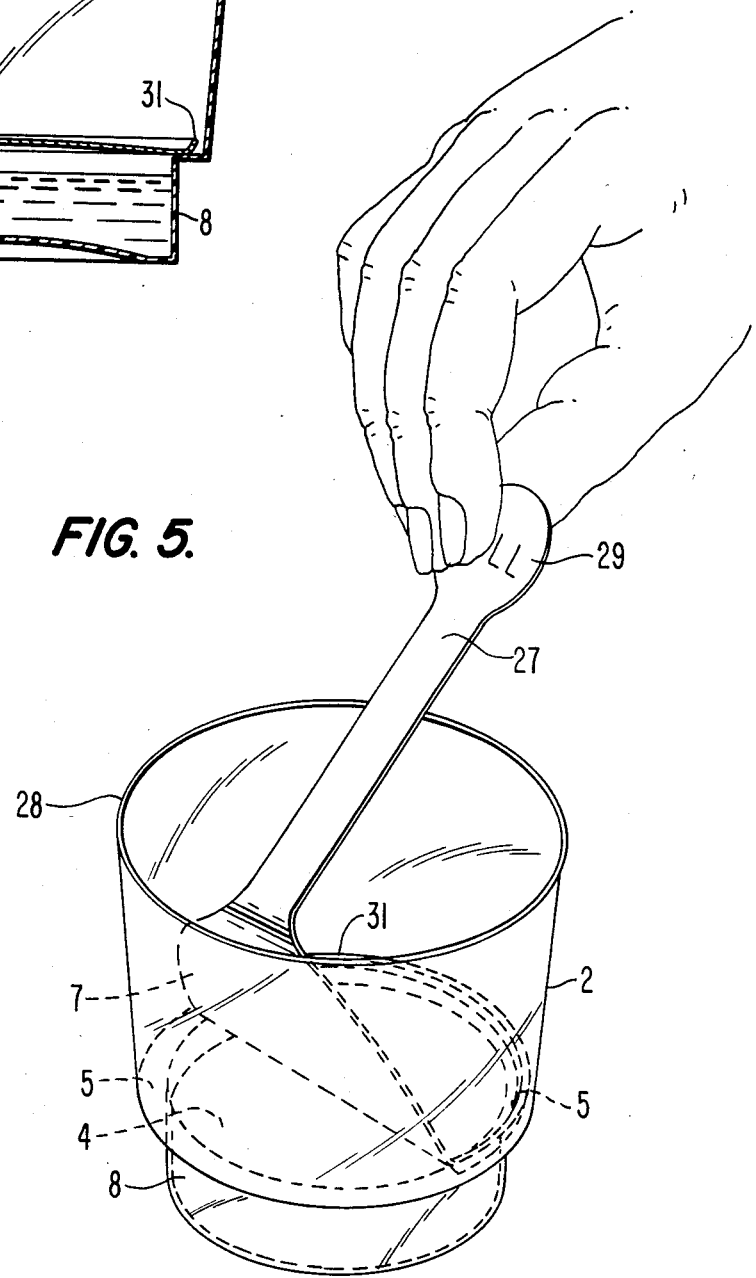
FIG. 5 is a further view of the stage of preparation shown in FIG. 4 but from a different direction.

The manner in which the cover or lid 7 is removed is essentially indicated in FIGS. 4 and 5. It is thought that a detailed description of the lid removal operation is not necessary in view of the content of these Figures.

As has been mentioned the lid or cover 7 when secured in place provides a peripheral skirt this is shown at 31 in the Figures. It has been found that the provision of the skirt 31 plays a significant part in the success of the sealing operation in that it is believed to provide a heat sink facility which ensures that the regions of the container wall 2 adjacent to the ledge 5 are protected from any undesired heating effect from the heating unit 26 which might lead to a weakening distortion of the container at such location. In addition, such heat protection arrangement prevents the container at the location in question from becoming blemished to an extent that the container becomes unsightly or otherwise unsuitable for marketing.

Furthermore, the formation of the skirt 31 provides a greater width to the base of the pull tab 27 at the region where the tab joins the remainder of the cover or lid 7. The formation of this wider region assists in avoiding the risk of undesired tearing occuring the pulling action, of the tab 27 from the remainder of the cover or lid 7. The skirt, furthermore, ensures that the free edge of the cover of lid 7 is not immediately adjacent to an adhered region of the cover or lid whereby any mechanical weaknesses such as incipient splits at the free edge cannot weaken the bond between the cover or lid and the ledge 5. One consequence of this is that the strength of the bond can be arranged to be greater than that practically possible with a lid or cover which is a precise fit within the container in the vicinity of the ledge 5.

As has been mentioned the lid or cover may be made from plastics or metallic foil. One such metallic material is Aluminium.* Also the container itself can be formed from any plastics material affording the acceptable characteristics. One such material is a clear polystyrene. The Aluminium needs to be sterile.

*In a preferred cover/lid the multiple-layer metal foil will be specially treated, processed and re-inforced.

It has been found that the combination of the container and lid or cover secured as above discussed satisfies the criteria of acceptability in respect of regulations appertaining to the packaging of alcoholic beverages. In particular the relevant requirements of Part 117 of Title 21 of the Code of Federal Regulations (Food and Drugs) relative to the packaging of Alcoholic Beverages that do not exceed 50% Alcohol by volume are readily met.

I claim:

1. A method of hermetically sealing a liquid receiving chamber located at the lower section from a liquid receiving chamber located at the upper section of a stackable disposable container of plastics material, in which the two chambers connect with each other by way of a peripheral step or ledge between said chambers, the method including the step of;

forming a lid or cover producing blank from a plastics or metallic material having the thickness of foil, the blank being of such dimensions that it may be secured to the step or ledge and also to provide a peripheral skirt region;

supporting the blank such that the blank may be brought into contact with the step or ledge;

bringing the blank, after the liquid has been introduced into the lower section, into co-operation with the ledge in such manner that the blank covers in the chamber; exerting pressure upon that part of the blank that is in co-operation with the step or ledge whilst simultaneously heating the said part to a temperature that following removal of the pressure and heating the part has been so adhered to the step or ledge as to produce a hermetic seal between the said part and the step or ledge whilst said peripheral skirt region and said container are not adhered, said hermetic seal permitting subsequent removal of said lid or cover by a peeling operation.

2. A method as claimed in claim 1, and in which a predetermined quantity of alcohol is introduced into the lower chamber prior to the securing of the lid or cover by guiding the alcohol to a location adjacent to the bottom of the container prior to the release of the alcohol into the chamber.

3. A method as claimed in claim 2, and in which the means for guiding the alcohol into the lower chamber involves passing the alcohol through a tubular spout which is axially displaceable whereby the flow of alcohol is controlled by the axially setting of the spout.

4. A method as claimed in claim 1, and in which the blank is supported by means of suction produced at outlet orifices of a plenum chamber arrangement which is used to mount a heating arrangement which enables localised heating of the lid or cover over the area of the ledge.

5. A method as claimed in claim 1, and in which the lid or cover is secured to the ledge by applying, for a time period of approximately 0.5 seconds, the lid or cover region immediately adjacent to the ledge a pressure of 2.5 to 3 pounds weight and producing a temperature of approximately 150° C. at said region.

* * * * *